United States Patent
Ricci et al.

(10) Patent No.: US 8,936,519 B2
(45) Date of Patent: Jan. 20, 2015

(54) POLYUREA COVERS FOR GOLF BALLS BASED ON ISOCYANATE BLENDS

(75) Inventors: Shawn Ricci, New Bedford, MA (US); Timothy S. Correia, New Bedford, MA (US); Michael Michalewich, Mansfield, MA (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 759 days.

(21) Appl. No.: 12/697,359

(22) Filed: Feb. 1, 2010

(65) Prior Publication Data

US 2011/0190075 A1    Aug. 4, 2011

(51) Int. Cl.
| | |
|---|---|
| A63B 37/04 | (2006.01) |
| A63B 37/12 | (2006.01) |
| A63B 37/00 | (2006.01) |
| A63B 37/02 | (2006.01) |

(52) U.S. Cl.
CPC .............. *A63B 37/00* (2013.01); *A63B 37/02* (2013.01); *A63B 37/12* (2013.01)
USPC .......................................... 473/371; 473/378

(58) Field of Classification Search
USPC ................................................ 473/351–378
See application file for complete search history.

(56) References Cited

U.S. PATENT DOCUMENTS

| | | | |
|---|---|---|---|
| 5,098,983 A * | 3/1992 | Mosbach et al. ................ 528/59 |
| 5,288,766 A * | 2/1994 | Narayan et al. ............... 521/128 |
| 5,334,673 A | 8/1994 | Wu |
| 5,484,870 A | 1/1996 | Wu |
| 5,692,974 A * | 12/1997 | Wu et al. ........................ 473/377 |
| 5,830,087 A * | 11/1998 | Sullivan et al. ............... 473/385 |
| 5,833,553 A * | 11/1998 | Sullivan et al. ............... 473/374 |
| 6,476,176 B1 | 11/2002 | Wu |
| 6,506,851 B2 | 1/2003 | Wu |
| 6,610,812 B1 | 8/2003 | Wu et al. |
| 6,716,954 B2 * | 4/2004 | Keller et al. .................... 528/73 |
| 6,835,794 B2 * | 12/2004 | Wu et al. ........................ 528/64 |
| 6,867,279 B2 | 3/2005 | Wu |
| 6,903,178 B2 * | 6/2005 | Wu et al. ........................ 528/60 |
| 6,958,379 B2 | 10/2005 | Wu et al. |
| 6,960,630 B2 | 11/2005 | Cavallaro et al. |
| 6,964,621 B2 | 11/2005 | Bulpett et al. |
| 7,014,574 B2 * | 3/2006 | Wu et al. ....................... 473/374 |
| 7,041,769 B2 | 5/2006 | Wu et al. |
| 7,105,623 B2 | 9/2006 | Wu et al. |
| 7,131,915 B2 | 11/2006 | Sullivan et al. |
| 7,186,777 B2 | 3/2007 | Wu et al. |

(Continued)

OTHER PUBLICATIONS

R. Xie et al., "Polyurethane Elastomers Based on 1,3 and 1,4-Bis(isocyantomethyl)cyclohexane", Presented May 1, 2008.

*Primary Examiner* — Alvin Hunter
(74) *Attorney, Agent, or Firm* — Daniel W. Sullivan

(57) ABSTRACT

A golf ball having a cover material made from a polyurea or polyurea/urethane hybrid composition is provided. The polyurea or polyurea/urethane composition is produced by the reaction of an isocyanate blend having an average NCO functionality in the range of 2.05 to 2.35, a polyamine compound, and amine or hydroxyl curing agent. The resulting cover material has many advantages including improved thermal-stability, durability, toughness, and cut/tear-resistance. The preferred isocyanates in the blend include isophorone diisocyanate ("IPDI"); 1,6-hexamethylene diisocyanate ("HDI"); 4,4'-dicyclohexylmethane diisocyanate ("$H_{12}$ MDI"); 4,4'-diphenylmethane diisocyanate (4,4'-MDI); toluene diisocyanate ("TDI"); and homopolymers and copolymers thereof.

13 Claims, 3 Drawing Sheets

(56) References Cited

U.S. PATENT DOCUMENTS

| | | |
|---|---|---|
| 7,232,859 B2 | 6/2007 | Argyropoulos et al. |
| 7,306,529 B2 * | 12/2007 | Kennedy et al. .............. 473/376 |
| 2005/0272530 A1 | 12/2005 | Wu |
| 2007/0265388 A1 | 11/2007 | Argyropoulos et al. |
| 2008/0090678 A1 | 4/2008 | Kim et al. |
| 2009/0105013 A1 | 4/2009 | Slagel et al. |
| 2011/0033712 A1 | 2/2011 | Xie et al. |
| 2012/0035001 A1 | 2/2012 | Xie |

* cited by examiner

POLYUREA COVERS FOR GOLF BALLS BASED ON ISOCYANATE BLENDS

BACKGROUND OF THE INVENTION

1. Field of the Invention

The present invention relates generally to a golf ball having a cover material made from a polyurea or polyurea/urethane hybrid composition. More particularly, the polyurea or polyurea/urethane is the reaction product of a blend of isocyanates, polyamines, and amine or hydroxyl curing agent. The resulting cover material has many advantages including improved thermal stability, durability, toughness, and cut/tear-resistance.

2. Brief Review of the Related Art

Multi-piece solid golf balls having an inner core and outer cover with an intermediate layer disposed there between are popular today in the golf industry. The inner core is made commonly of a rubber material such as natural and synthetic rubbers, styrene butadiene, polybutadiene, poly(cis-isoprene), or poly(trans-isoprene). Often, the intermediate layer is made of an olefin-based ionomer resin that imparts hardness to the ball. These ionomer acid copolymers contain inter-chain ionic bonding, and are generally made of an α-olefin such as ethylene and a vinyl comonomer having an acid group such as methacrylic, acrylic acid, or maleic acid. Metal ions such as sodium, lithium, zinc, and magnesium are used to neutralize the acid groups in the copolymer. Commercially available olefin-based ionomer resins are used in different industries and include numerous resins sold under the trademarks, Surlyn® (available from DuPont) and Escor® and Iotek® (available from ExxonMobil), Amplify IO® (available from Dow Chemical) and Clarix® (available from A. Schulman). Olefin-based ionomer resins are available in various grades and identified based on the type of base resin, molecular weight, and type of metal ion, amount of acid, degree of neutralization, additives, and other properties. The outer cover of conventional golf balls are made from a variety of materials including olefin-based ionomers, polyamides, polyesters, and thermoplastic and thermoset polyurethane and polyurea elastomers.

In recent years, there has been high interest in using thermoset, castable polyurethanes and polyureas to make core, intermediate, and/or cover layers for the golf balls. Basically, polyurethane compositions contain urethane linkages formed by reacting an isocyanate group (—N═C═O) with a hydroxyl group (OH). Polyurethanes are produced by the reaction of a multi-functional isocyanate with a polyol in the presence of a catalyst and other additives. The chain length of the polyurethane prepolymer is extended by reacting it with a hydroxyl-terminated curing agent. Polyurea compositions, which are distinct from the above-described polyurethanes, also can be formed. In general, polyurea compositions contain urea linkages formed by reacting an isocyanate group (—N═C═O) with an amine group (NH or $NH_2$). The chain length of the polyurea prepolymer is extended by reacting the prepolymer with an amine curing agent. Hybrid compositions containing urethane and urea linkages also may be produced. For example, a polyurea/urethane hybrid composition may be produced when a polyurea prepolymer is reacted with a hydroxyl-terminated curing agent as discussed further below.

Golf ball covers made from polyurethane and polyurea compositions are generally known in the industry. In recent years, polyurethane and polyurea cover materials have become more popular, because they provide the golf ball covers with a desirable combination of "hard" and "soft" features. The relative hardness of the cover protects the ball from being cut, abraded, and otherwise damaged. In addition, such harder-covered golf balls generally reach a higher velocity when struck by a club. As a result, such golf balls tend to travel a greater distance, which is particularly important for driver shots off the tee. Meanwhile, the relative softness of the cover provides the player with a better "feel" when he/she strikes the ball with the club face. The player senses more control over the ball as the club face makes impact. Such softer-covered balls tend to have better playability. The softer cover allows players to place a spin on the ball and better control its flight pattern. This is particularly important for approach shots near the green. Polyurethane and polyurea covered golf balls are described in the patent literature, for example, U.S. Pat. Nos. 5,334,673; 5,484,870; 6,476,176; 6,506,851; 6,867,279; 6,958,379; 6,960,630; 6,964,621; 7,041,769; 7,105,623; 7,131,915; and 7,186,777.

As discussed above, isocyanates with two or more functional groups are essential components in producing polyurethane and polyurea polymers. These isocyanate materials can be referred to as multi-functional isocyanates. Such isocyanates can be referred to as monomers or monomeric units, because they can be polymerized to produce polymeric isocyanates containing two or more monomeric isocyanate repeat units.

Aromatic isocyanates are normally used for several reasons including their high reactivity and cost benefits. Examples of conventional aromatic isocyanates include, but are not limited to, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PDI), m-phenylene diisocyanate (PDI), naphthalene 1,5-diisocynate (NDI), naphthalene 2,4-diisocyanate (NDI), p-xylene diisocyanate (XDI), and homopolymers and copolymers thereof. The aromatic isocyanates are able to react with the hydroxyl or amine compounds and form a durable and tough polymer having a high melting point. The resulting polyurethane or polyurea generally has good mechanical strength and cut/shear resistance. However, one disadvantage with using aromatic isocyanates is the polymeric reaction product tends to have poor light stability and may discolor upon exposure to light, particularly ultraviolet (UV) light. Because aromatic isocyanates are used as a reactant, some aromatic structures may be found in the reaction product. UV light rays can cause quinoidation of the benzene rings resulting in yellow discoloration. Hence, UV light stabilizers are commonly added to the formulation, but the covers may still develop a yellowish appearance over prolonged exposure to sunlight. Thus, golf balls are normally painted with a white paint and then covered with a transparent coating to protect the ball's appearance.

In a second approach, aliphatic isocyanates are used to form the prepolymer. Examples of aliphatic isocyanates include, but are not limited to, isophorone diisocyanate (IPDI), 1,6-hexamethylene diisocyanate (HDI), 4,4'-dicyclohexylmethane diisocyanate ("$H_{12}$ MDI"), and homopolymers and copolymers thereof. These aliphatic isocyanates can provide polymers having good light stability but such polymers tend to have reduced mechanical strength and cut/shear-resistance.

As discussed above, golf ball covers having good light stability are needed. One objective of this invention is to develop a golf ball cover having good light stability that does not sacrifice important mechanical properties such as high tensile strength and cut/tear-resistance. It is also desirable that the golf ball cover be made of a tough and durable material that can withstand high temperatures for significant periods of time. Another objective of this invention is to develop a golf ball having high thermal stability. When polyurea and polyurea/urethane hybrid compositions are used as the cover materials, the properties of the composition depend in significant part upon the components or building blocks used to make the compositions, particularly the isocyanates, polyamines, and curing agents. It would be beneficial to develop isocyanate blends that could provide the polyurea and polyurea/urethane compositions with such desirable properties as high tensile strength, impact durability, cut/tear-resistance, light stability, and thermal stability. One objective of this invention is to develop such isocyanate blends. The present invention provides golf ball cover materials having such characteristics as well as other advantageous properties, features, and benefits.

SUMMARY OF THE INVENTION

The present invention provides a golf ball having a cover material made from a polyurea or polyurea/urethane composition, which is the reaction product of the cover layer being formed from a polyurea or polyurea/urethane hybrid composition that is produced by a reaction of: i) a blend of two or more of: isophorone diisocyanate ("IPDI"), 1,6-hexamethylene diisocyanate ("HDI"), 4,4'-dicyclohexylmethane diisocyanate ("$H_{12}$ MDI"), 4,4'-diphenylmethane diisocyanate (4,4'-MDI), toluene diisocyanate ("TDI"), and homopolymers and copolymers thereof, wherein the blend has an average NCO functionality in the range of 2.05 to 2.35; ii) a polyamine compound; and iii) a curing agent selected from the group consisting of amine-terminated curing agents, hydroxyl-terminated curing agents and mixtures thereof. By the term, "NCO functionality in the range of 2.05 to 2.35," it is meant the polyisocyanates have an average of 2.05 to 2.35 NCO groups per molecule. The resulting polyurea cover material has many advantages including improved durability, toughness, cut/shear-resistance, thermal-stability, and light-stability. In one version, the golf ball includes a polybutadiene core, an intermediate casing layer made of an ionomer resin, and an outer cover layer made of the polyurea composition that surrounds the casing layer. Golf balls made in accordance with this invention may have various constructions. In one embodiment, the core has a diameter of about 1.26 to about 1.60 inches, the intermediate layer has a thickness in the range of about 0.015 to about 0.120 inches, and the cover has a thickness of about 0.020 inches to about 0.050 inches.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE PREFERRED EMBODIMENTS

Figure 1:
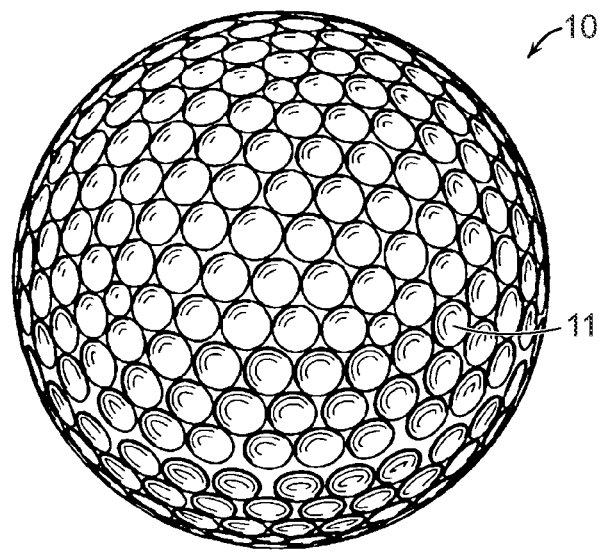
FIG. 1 is a front view of a dimpled golf ball made in accordance with the present invention.

The present invention relates generally to golf balls having a cover material made from a polyurea, or a hybrid polyurea/urethane composition.

Polyurea Compositions

In general, polyurea compositions contain urea linkages formed by reacting an isocyanate group (—N=C=O) with an amine group (NH or $NH_2$). The chain length of the polyurea prepolymer is extended by reacting the prepolymer with an amine curing agent. The resulting polyurea has elastomeric properties, because of its "hard" and "soft" segments, which are covalently bonded together. The soft, amorphous, low-melting point segments, which are formed from the polyamines, are relatively flexible and mobile, while the hard, high-melting point segments, which are formed from the isocyanate and chain extenders, are relatively stiff and immobile. The phase separation of the hard and soft segments provides the polyurea with its elastomeric resiliency. The polyurea composition contains urea linkages having the following general structure:

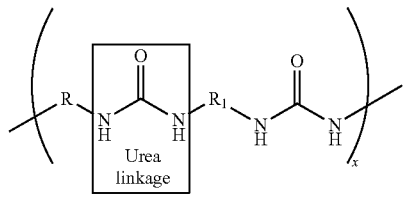

Polyurea/Polyurethane Hybrid Compositions

A polyurea/polyurethane hybrid composition is produced when the polyurea prepolymer (as described above) is chain-extended using a hydroxyl-terminated curing agent. Any excess isocyanate groups in the prepolymer will react with the hydroxyl groups in the curing agent and create urethane linkages. That is, a polyurea/polyurethane hybrid composition is produced.

In a preferred embodiment, a pure polyurea composition, as described above, is prepared. That is, the composition contains only urea linkages. An amine-terminated curing agent is used in the reaction to produce the pure polyurea composition. However, it should be understood that a polyurea/polyurethane hybrid composition also may be prepared in accordance with this invention as discussed above. Such a hybrid composition can be formed if the polyurea prepolymer is cured with a hydroxyl-terminated curing agent. Any excess isocyanate in the polyurea prepolymer reacts with the hydroxyl groups in the curing agent and forms urethane linkages. The resulting polyurea/polyurethane hybrid composition contains both urea and urethane linkages. The general structure of a urethane linkage is shown below:

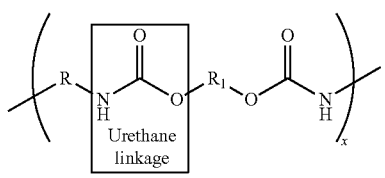

More particularly, in one preferred version of the ball covering, the polymer matrix constituting the ball covering consists of 100% by weight of the polyurea or polyurea/urethane composition of this invention. In another version, the polymer matrix of the ball covering comprises a polymeric blend. The polyureas or polyurea/urethanes of this invention may be blended with non-ionomeric polymers to form the composition that will be used to make the golf ball cover. Examples of non-ionomeric polymers include vinyl resins, polyolefins including those produced using a single-site catalyst or a metallocene catalyst, polyurethanes, polyureas, polyamides, polyphenylenes, polycarbonates, polyesters, polyacrylates, engineering thermoplastics, and the like. The blend may contain about 10 to about 90% by weight of the polyurea or polyurea/urethane and about 90 to about 10% by weight of a non-ionomeric polymer.

In yet another version, the polyureas or polyurea/urethanes are blended with olefin-based ionomers, such as ethylene-based ionic copolymers, which normally include an unsaturated carboxylic acid, such as methacrylic acid, acrylic acid, or maleic acid. Other possible carboxylic acid groups include, for example, crotonic, maleic, fumaric, and itaconic acid. Low acid and high acid olefin-based ionomers, as well as blends of such ionomers, may be used. The acidic group in the olefin-based ionic copolymer is partially or totally neutralized with metal ions such as zinc, sodium, lithium, magnesium, potassium, calcium, manganese, nickel, chromium, copper, or a combination thereof. For example, ionomeric resins having carboxylic acid groups that are neutralized from about 10 percent to about 100 percent may be used. In one embodiment, the neutralization level is from 10 to 80%, more preferably 20 to 70%, and most preferably 30 to 50%. In another embodiment, the neutralization level is from 80 to 100%, more preferably 90 to 100%, and most preferably 95 to 100%. The blend may contain about 10 to about 90% by weight of the polyurea or polyurea/urethane and about 90 to about 10% by weight of a partially, highly, or fully-neutralized olefin-based ionomeric copolymer.

The polyurea and polyurea/urethane compositions making up the covers of the golf balls may contain additives, ingredients, and other materials that do not detract from the properties of the final composition. These additional materials include, but are not limited to, catalysts, wetting agents, coloring agents, optical brighteners, cross-linking agents, whitening agents such as titanium dioxide and zinc oxide, UV light absorbers, hindered amine light stabilizers, defoaming agents, processing aids, surfactants, and other conventional additives. For example, wetting additives may be added to more effectively disperse the pigments. Other suitable additives include antioxidants, stabilizers, softening agents, plasticizers, including internal and external plasticizers, impact modifiers, foaming agents, density-adjusting fillers, reinforcing materials, compatibilizers, and the like. Density-adjusting fillers can be added to modify the modulus, tensile strength, and other properties of the compositions. Examples of useful fillers include zinc oxide, zinc sulfate, barium carbonate, barium sulfate, calcium oxide, calcium carbonate, clay, tungsten, tungsten carbide, silica, and mixtures thereof. Regrind (recycled core material) high-Mooney-viscosity rubber regrind, and polymeric, ceramic, metal, and glass microspheres also may be used. Generally, the additives will be present in the composition in an amount between about 1 and about 70 weight percent based on the total weight of the composition depending upon the desired properties.

Isocyanate Compounds

As discussed above, a polyurea composition is an elastomeric material that is the reaction product of an isocyanate component and amine-terminated polymer resin. There are many isocyanate compounds known in the art. In the present invention, it is important that the isocyanates making up the polyurea or polyurea/urethane hybrid composition provide the composition with sufficient thermal stability so that it can withstand high temperatures. The composition must have high mechanical integrity so that it does not melt or soften easily. That is, the composition must have some relatively stiff characteristics. At the same time, it is important that the composition be not overly stiff and inflexible. The composition needs to be elastomeric and have sufficient resiliency. This elastomeric nature will help provide the composition with higher cut/tear-resistance and tensile strength. Surprisingly, it has been found that the following blends of isocyanate compounds provide the resulting polyurea and polyurea/urethane composition with an optimum combination of properties:

a) 65 to 45 wt. % of isophorone diisocyanate ("IPDI") and 35 to 55 wt. % of 1,6-hexamethylene diisocyanate ("HDI") homopolymer having an average NCO functionality of 2.5, wherein the blend has an average NCO functionality in the range of 2.05 to 2.35. In particular, it has been found that HDI polyisocyanate sold under the trademark, Desmodur® N3400 (available from Bayer Material Science, LLC, Pittsburgh, Pa.) is effective.

b) 70 to 50 wt. % of 4,4'-dicyclohexylmethane diisocyanate ("$H_{12}$ MDI," i.e., bis(4-isocyanatocyclohexyl)-methane) and 30 to 50 wt. % of HDI homopolymer having an average NCO functionality of 2.5, wherein the blend has an average NCO functionality in the range of 2.05 to 2.35. In particular, it has been found that HDI polyisocyanate sold under the trademark, Desmodur® N3400 (Bayer Material Science) is effective.

c) 40 to 10 wt. % of $H_{12}$MDI and 60 to 90 wt. % of HDI homopolymer having an average NCO functionality of approximately 2.3, wherein the blend has an average NCO functionality in the range of 2.05 to 2.35. In particular, it has been found that HDI polyisocyanate sold under the trademark, Desmodur® XP 2730 (Bayer Material Science) is effective.

d) 90 to 80 wt. % of 4,4'-diphenylmethane diisocyanate (4,4'-MDI) and 10 to 20 wt. % of toluene diisocyanate ("TDI") trimer, wherein the blend has an average NCO functionality in the range of 2.05 to 2.35.

e) 90 to 80 wt. % of 4,4'-MDI and 10 to 20 wt. % of HDI trimer, wherein the blend has an average NCO functionality in the range of 2.05 to 2.35.

The above-described aliphatic isocyanate blends (above examples a-c) can be reacted with polyamines to produce polyureas having relatively high cut/tear-resistance, mechanical integrity, light stability, and thermal stability. The aliphatic isocyanate blends are able to provide polymers having advantageous mechanical properties normally found in polymers produced using aromatic isocyanate compounds. At the same time, the polymers have good light-stability and thermal-stability. As described above, it is important the isocyanate blends have an average NCO functionality in the range of 2.05 to 2.35. Regarding the above-described aromatic isocyanate blends (above examples d-e), these blends are able to react and form polymers having good mechanical properties such as high tensile strength and cut/tear-resistance as well as high thermal-stability. Moreover, the polymers produced using the isocyanate blends of this invention having high thermal-stability, even when the average NCO functionality is relatively low. For example, it has been found that isocyanate blends having an average NCO functionality of less than 2.20 can be used to produce polymers having high thermal-stability. In the following Table I, different sample isocyanate blends are described along with the physical properties of the resulting polymers. As shown in Table I, when isocyanate blends having an average NCO functionality outside of the range of 2.05 to 2.35 are used, the resulting polymers tend to have either poor thermal-stability or poor mechanical properties.

TABLE I (Isocyanate Blends)

| Polymer | Average Functionality of Isocyanate Blend | Thermal Stability | Mechanical Properties |
|---|---|---|---|
| 6.5% NCO prepolymer made from HDI homopolymer and amine-terminated PTMEG cured with DETDA. | 3.00 | Good - maintains integrity above 100° C. | Cuts and tears. |
| 6.5% NCO prepolymer made from HDI homopolymer and amine-terminated PTMEG cured with DETDA. | 2.50 | Good - maintains integrity above 100° C. | Cuts and tears. |
| 7.0% NCO prepolymer made from $H_{12}$MDI homopolymer and amine-terminated PTMEG cured with DETDA. | 2.00 | Melts and softens. | Good impact and shear durability. |
| 7.2% NCO Prepolymer made from 54% IPDI & 46% HDI Homopolymer (fn = 2.5) and amine-terminated PTMEG cured with DETDA. | 2.14 | Good - maintains integrity above 100° C. | Good impact and shear durability. |
| 7.0% NCO Prepolymer made with 60% $H_{12}$MDI & 40% HDI Homopolymer (fn = 2.5) and amine-terminated PTMEG cured with DETDA. | 2.13 | Good - maintains integrity above 100° C. | Good impact and shear durability. |
| 7.2% NCO Prepolymer made from 80% HDI Homopolymer (fn = 2.3) & 20% $H_{12}$MDI and amine-terminated PTMEG cured with DETDA. | 2.22 | Good - maintains integrity above 100° C. | Good impact and shear durability. |
| 6.5% NCO Prepolymer made from 85% 4,4'-MDI & 15% TDI Trimer and amine-terminated PTMEG cured with Ethacure 300. | 2.08 | Good - maintains integrity above 100° C. | Good impact and shear durability. |
| 6.5% NCO Prepolymer made from 80% 4,4'-MDI & 20% HDI Trimer and amine-terminated PTMEG cured with Ethacure 300. | 2.11 | Good - maintains integrity above 100° C. | Good impact and shear durability. |

Polyamine Compounds

When forming a polyurea prepolymer per this invention, any suitable polyamine may be reacted with the above-described isocyanate blends in accordance with this invention. Such polyamines include amine-terminated compounds, for example, amine-terminated hydrocarbons, polyethers, polyesters, polycarbonates, polycaprolactones, and mixtures thereof. The molecular weight of the amine compound is generally in the range of about 100 to about 10,000. Suitable polyether amines include, but are not limited to, methyldiethanolamine; polyoxyalkylenediamines such as, polytetramethylene ether diamines, polyoxypropylenetriamine, polyoxyethylene diamines, and polyoxypropylene diamines; poly(ethylene oxide capped oxypropylene)ether diamines; propylene oxide-based triamines; triethyleneglycoldiamines; glycerin-based triamines; and mixtures thereof. In one embodiment, the polyether amine used to form the prepolymer is Jeffamine D2000 (Huntsman Corp.). Additional amine-terminated compounds also may be useful in forming the polyurea prepolymers of the present invention including, but not limited to, poly(acrylonitrile-co-butadiene); poly(1,4-butanediol)bis(4-aminobenzoate) in liquid or waxy solid form; linear and branched polyethylene imine; low and high molecular weight polyethylene imine having an average molecular weight of about 500 to about 30,000; polypropylene glycol)bis(2-aminopropyl ether) having an average molecular weight of about 200 to about 5,000; polytetrahydrofuran bis(3-aminopropyl) terminated having an average molecular weight of about 200 to about 2000; and mixtures thereof (Aldrich Co.). Preferably, the amine-terminated compound is a copolymer of polytetramethylene oxide and polypropylene oxide (Huntsman Corp.)

Manufacturing Process

There are two basic techniques that can be used to make the polyurea and polyurea/urethane compositions of this invention: a) one-shot technique, and b) prepolymer technique. In the one-shot technique, the isocyanate blend, polyamine, and hydroxyl and/or amine-terminated curing agent are reacted in one step. On the other hand, the prepolymer technique involves a first reaction between the isocyanate blend and polyamine to produce a polyurea prepolymer, and a subsequent reaction between the prepolymer and hydroxyl and/or amine-terminated curing agent. As a result of the reaction between the isocyanate and polyamine compounds, there will be some unreacted NCO groups in the polyurea prepolymer. The prepolymer should have less than 14% unreacted NCO groups. Preferably, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

Either the one-shot or prepolymer method may be employed to produce the polyurea and polyurea/urethane compositions of the invention; however, the prepolymer technique is preferred because it provides better control of the chemical reaction. The prepolymer method provides a more homogeneous mixture resulting in a more consistent polymer composition. The one-shot method results in a mixture that is inhomogeneous (more random) and affords the manufacturer less control over the molecular structure of the resultant composition.

In the casting process, the polyurea and polyurea/urethane compositions can be formed by chain-extending the polyurea prepolymer with a single curing agent or blend of curing agents as described further below. The compositions of the present invention may be selected from among both castable thermoplastic and thermoset materials. Thermoplastic polyurea compositions are typically formed by reacting the isocyanate blend and polyamines at a 1:1 stoichiometric ratio. Thermoset compositions, on the other hand, are cross-linked polymers and are typically produced from the reaction of the isocyanate blend and polyamines at normally a 1.05:1 stoichiometric ratio. In general, thermoset polyurea compositions are easier to prepare than thermoplastic polyureas.

Chain-Extending of Prepolymer

The polyurea prepolymer can be chain-extended by reacting it with a single curing agent or blend of curing agents. In general, the prepolymer can be reacted with hydroxyl-terminated curing agents, amine-terminated curing agents, or mixtures thereof. The curing agents extend the chain length of the prepolymer and build-up its molecular weight. Normally, the prepolymer and curing agent are mixed so the isocyanate groups and hydroxyl or amine groups are mixed at a 1.05:1.00 stoichiometric ratio.

A catalyst may be employed to promote the reaction between the isocyanate and polyamine compounds for producing the prepolymer or between prepolymer and curing agent during the chain-extending step. Preferably, the catalyst is added to the reactants before producing the prepolymer. Suitable catalysts include, but are not limited to, bismuth catalyst; zinc octoate; stannous octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, and tributylamine; organic acids such as oleic acid and acetic acid; delayed catalysts; and mixtures thereof. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

The hydroxyl chain-extending (curing) agents are preferably selected from the group consisting of ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl)ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy)ethoxy] cyclohexane; 1,3-bis-{2-[2-(2-hydroxyethoxy)ethoxy] ethoxy}cyclohexane; trimethylolpropane; polytetramethylene ether glycol (PTMEG), preferably having a molecular weight from about 250 to about 3900; and mixtures thereof.

Suitable amine chain-extending (curing) agents that can be used in chain-extending the polyurea prepolymer of this invention include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-)toluenediamine or "DETDA", 3,5-dimethylthio-(2,4- or 2,6-)toluenediamine, 3,5-diethylthio-(2,4- or 2,6-) toluenediamine, 3,3'-dimethyl-4,4'-diamino-diphenylmethane, 3,3'-diethyl-5,5'-dimethyl-4,4'-diamino-diphenylmethane (i.e., 4,4'-methylene-bis(2-ethyl-6-methyl-benezeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenylmethane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"), 4,4'-bis(sec-butylamino)-diphenylmethane, N,N'-dialkylamino-diphenylmethane, trimethyleneglycol-di (p-aminobenzoate), polyethyleneglycol-di(p-aminobenzoate), polytetramethyleneglycol-di(p-aminobenzoate); saturated diamines such as ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), methylimino-bis(propylamine) (i.e., N-(3-aminopropyl)-N-methyl-1,3-propanediamine), 1,4-bis(3-aminopropoxy)butane (i.e., 3,3'-[1,4-butanediylbis-(oxy)bis]-1-propanamine), diethyleneglycol-bis(propylamine) (i.e., diethyleneglycol-di(aminopropyl)ether), 4,7,10-trioxamidecane-1,13-diamine, 1-methyl-2,6-diamino-cyclohexane, 1,4-diamino-cyclohexane, poly(oxyethylene-oxypropylene)diamines, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, 3,3'-dichloro-4,4'-diamino-dicyclohexylmethane, N,N'-dialkylamino-dicyclohexylmethane, polyoxyethylene diamines, 3,3'-diethyl-5,5'-dimethyl-4,4'-diamino-dicyclohexylmethane, polyoxypropylene diamines, 3,3'-diethyl-5,5'-dichloro-4,4'-diamino-dicyclohexylmethane, polytetramethylene ether diamines, 3,3',5,5'-tetraethyl-4,4'-diamino-dicyclohexylmethane (i.e., 4,4'-methylene-bis(2,6-diethylaminocyclohexane)), 3,3'-dichloro-4,4'-diamino-dicyclohexylmethane, 2,2'-dichloro-3,3',5,5'-tetraethyl-4,4'-diamino-dicyclohexylmethane, (ethylene oxide)-capped polyoxypropylene ether diamines, 2,2',3,3'-tetrachloro-4,4'-diamino-dicyclohexylmethane, 4,4'-bis(sec-butylamino)-dicyclohexylmethane; triamines such as diethylene triamine, dipropylene triamine, (propylene oxide)-based triamines (i.e., polyoxypropylene triamines), N-(2-aminoethyl)-1,3-propylenediamine (i.e., $N_3$-amine), glycerin-based triamines, (all saturated); tetramines such as N,N'-bis(3-aminopropyl)ethylene diamine (i.e., $N_4$-amine) (both saturated), triethylene tetramine; and other polyamines such as tetraethylene pentamine (also saturated). One suitable amine-terminated chain-extending agent is Ethacure 300™ (dimethylthiotoluenediamine or a mixture of 2,6-diamino-3,5-dimethylthiotoluene and 2,4-diamino-3, 5-dimethylthiotoluene.) The amine curing agents used as chain extenders normally have a cyclic structure and a low molecular weight (250 or less).

When the polyurea prepolymer is reacted with amine-terminated curing agents during the chain-extending step, as described above, the resulting composition is essentially a pure polyurea composition. On the other hand, when the polyurea prepolymer is reacted with a hydroxyl-terminated curing agent during the chain-extending step, any excess isocyanate groups in the prepolymer will react with the hydroxyl groups in the curing agent and create urethane linkages to form a polyurea/urethane hybrid.

This chain-extending step, which occurs when the polyurea prepolymer is reacted with hydroxyl curing agents, amine curing agents, or mixtures thereof, builds-up the molecular weight and extends the chain length of the prepolymer. When the polyurea prepolymer is reacted with amine curing agents, a polyurea composition having urea linkages is produced. When the polyurea prepolymer is reacted with hydroxyl curing agents, a polyurea/urethane hybrid composition containing both urea and urethane linkages is produced. The polyurea/urethane hybrid composition is distinct from the pure polyurea composition. The concentration of urea and urethane linkages in the hybrid composition may vary. In general, the hybrid composition may contain a mixture of about 10 to 90% urea and about 90 to 10% urethane linkages. The resulting polyurea or polyurea/urethane hybrid composition has elastomeric properties based on phase separation of the soft and hard segments. The soft segments, which are formed from the polyamine reactants, are generally flexible and mobile, while the hard segments, which are formed from the isocyanates and chain extenders, are generally stiff and immobile.

Ball Construction

Figure 2:
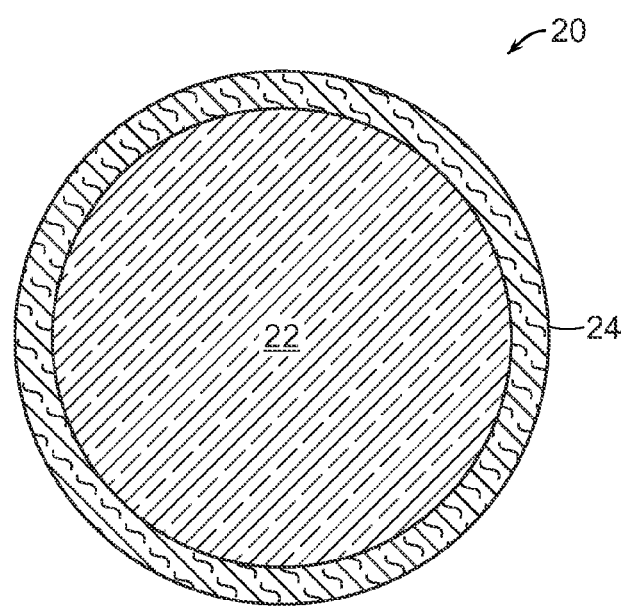
FIG. 2 is a cross-sectional view of a two-piece golf ball having a polyurea cover made in accordance with the present invention.
Figure 3:
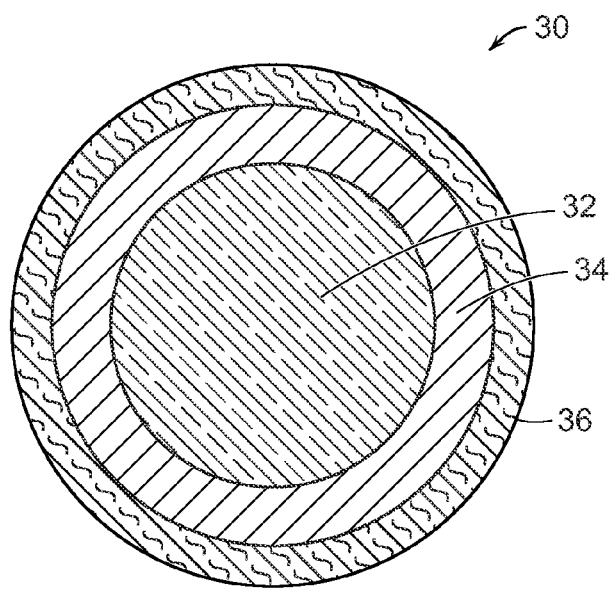
FIG. 3 is a cross-sectional view of a three-piece golf ball having a polyurea cover made in accordance with the present invention.

The polyurea and polyurea/urethane cover materials of this invention may be used with any type of ball construction known in the art. Such golf ball designs include, for example, single piece, two-piece, three-piece, and four-piece designs. The core, intermediate casing, and cover can be single or multi-layered. Referring to FIG. 1, one version of a golf ball that can be made in accordance with this invention is generally indicated at (10). Various patterns and geometric shapes of dimples (11) can be used to modify the aerodynamic properties of the golf ball (10). The dimples (11) can be arranged on the surface of the ball (10) using any suitable method known in the art. Referring to FIG. 2, a two-piece golf ball (20) that can be made in accordance with this invention is illustrated. In this version, the ball (20) includes a solid core (22) and polyurea cover (24). In FIG. 3, a three-piece golf ball (30) having a solid core (32), an intermediate layer (34), and polyurea cover (36) is shown.

Core

The core of the golf ball may be solid, semi-solid, fluid-filled, or hollow, and the core may have a single-piece or multi-piece structure. The cores in the golf balls of this invention are typically made from rubber compositions containing a base rubber, free-radical initiator agent, cross-linking co-agent, and fillers. The base rubber may be selected, for example, from polybutadiene rubber, polyisoprene rubber, natural rubber, ethylene-propylene rubber, ethylene-propylene diene rubber, styrene-butadiene rubber, and combinations of two or more thereof. A preferred base rubber is polybutadiene. Another preferred base rubber is polybutadiene optionally mixed with one or more elastomers such as polyisoprene rubber, natural rubber, ethylene propylene rubber, ethylene propylene diene rubber, styrene-butadiene rubber, polystyrene elastomers, polyethylene elastomers, polyurethane elastomers, polyurea elastomers, acrylate rubbers, polyoctenamers, metallocene-catalyzed elastomers, and plastomers. The base rubber typically is mixed with at least one reactive cross-linking co-agent to enhance the hardness of the rubber composition. Suitable co-agents include, but are not limited to, unsaturated carboxylic acids and unsaturated vinyl compounds. A preferred unsaturated vinyl is trimethylolpropane methacrylate.

The rubber composition is cured using a conventional curing process. Suitable curing processes include, for example, peroxide curing, sulfur curing, high-energy radiation, and combinations thereof. In one embodiment, the base rubber is peroxide cured. Organic peroxides suitable as free-radical initiators include, for example, dicumyl peroxide; n-butyl-4, 4-di(t-butylperoxy)valerate; 1,1-di(t-butylperoxy)3,3,5-trimethylcyclohexane; 2,5-dimethyl-2,5-di(t-butylperoxy)hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. Cross-linking agents are used to cross-link at least a portion of the polymer chains in the composition. Suitable cross-linking agents include, for example, metal salts of unsaturated carboxylic acids having from 3 to 8 carbon atoms; unsaturated vinyl compounds and polyfunctional monomers (e.g., trimethyloipropane trimethacrylate); phenylene bismaleimide; and combinations thereof. In a particular embodiment, the cross-linking agent is selected from zinc salts of acrylates, diacrylates, methacrylates, and dimethacrylates. In another particular embodiment, the cross-linking agent is zinc diacrylate ("ZDA"). Commercially available zinc diacrylates include those selected from Rockland React-Rite and Sartomer.

The rubber compositions also may contain "soft and fast" agents such as a halogenated organosulfur, organic disulfide, or inorganic disulfide compounds. Particularly suitable halogenated organosulfur compounds include, but are not limited to, halogenated thiophenols. Preferred organic sulfur compounds include, but not limited to, pentachlorothiophenol ("PCTP") and a salt of PCTP. A preferred salt of PCTP is ZnPCTP. A suitable PCTP is sold by the Struktol Company (Stow, Ohio) under the tradename, A95. ZnPCTP is commercially available from EchinaChem (San Francisco, Calif.). These compounds also may function as cis-to-trans catalysts to convert some cis-1, 4 bonds in the polybutadiene to trans-1, 4 bonds. Antioxidants also may be added to the rubber compositions to prevent the breakdown of the elastomers. Other ingredients such as accelerators (for example, tetra methylthiuram), processing aids, dyes and pigments, wetting agents, surfactants, plasticizers, as well as other additives known in the art may be added to the rubber composition. The core may be formed by mixing and forming the rubber composition using conventional techniques. These cores can be used to make finished golf balls by surrounding the core with outer core layer(s), intermediate layer(s), and/or cover materials as discussed further below. In another embodiment, the cores can be formed using a highly neutralized polymer (HNP) compositions as disclosed in U.S. Pat. Nos. 6,756,436, 7,030,192, 7,402,629, and 7,517,289. Furthermore, the cores from the highly neutralized polymer compositions can be further cross-linked using any cross-linkable sources including radiation sources such as gamma or electron beam as well as chemical sources such as peroxides and the like.

Figure 4:
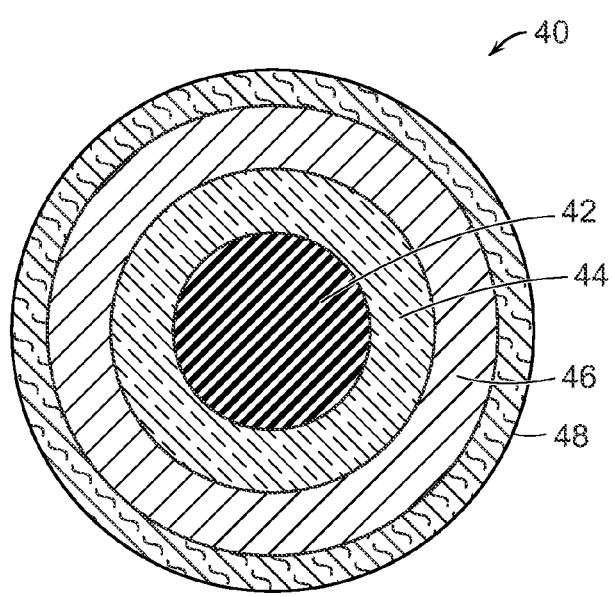
FIG. 4 is a cross-sectional view of a four-piece golf ball having a multi-layered core and a polyurea cover made in accordance with the present invention.

Golf balls made in accordance with this invention can be of any size, although the USGA requires that golf balls used in competition have a diameter of at least 1.68 inches and a weight of no greater than 1.62 ounces. For play outside of USGA competition, the golf balls can have smaller diameters and be heavier. For example, the diameter of the golf ball may be in the range of about 1.68 to about 1.80 inches. In one embodiment, as shown in FIG. 2, the core is a single-piece having an outside diameter of about 1.00 to about 1.65 inches. Preferably, the single-piece core has a diameter of about 1.50 to about 1.64 inches. The core generally makes up a substantial portion of the ball, for example, the core may constitute at least about 90% of the ball. The hardness of the core may vary depending upon desired properties of the ball. In general, core hardness is in the range of about 10 to about 75 Shore D and more preferably in the range of about 10 to about 60 Shore D. The compression of the core is generally in the range of about 30 to about 110 and more preferably in the range of about 50 to about 100. In general, when the ball contains a relatively soft core, the resulting a driver spin rate of the ball is relatively low. On the other hand, when the ball contains a relatively hard core, the resulting spin rate of the ball is relatively high. In another embodiment, as shown in FIG. 4, the golf ball (40) contains a core made of two pieces. The inner core (42) is made of a first rubber composition as described above, while the outer core layer (44) is made of a second rubber composition. The first and second rubber compositions contain different ingredients. The golf ball further includes an intermediate casing layer (46) and polyurea or polyurea/urethane cover layer (48). Conventional thermoplastic or thermoset resins such as olefin-based ionomeric copolymers, polyamides, polyesters, polycarbonates, polyolefins, polyurethanes, and polyureas as described above can be used to make the casing layer (46).

In such multi-layered cores, the inner core (42) preferably has a diameter of about 0.50 to about 1.30 inches, more preferably 1.00 to 1.15 inches, and is relatively soft (that is, it may have a compression of less than about 30.) Meanwhile, the encapsulating outer core layer (44) generally has a thickness of about 0.030 to about 0.070 inches, preferably 0.035 to 0.065 inches and is relatively hard (compression of about 70 or greater.) The outer core layer (44) preferably has a Shore D surface hardness in the range of about 40 to about 70. That is, the two-piece core, which is made up of the inner core (42) and outer core layer (44), preferably has a total diameter of about 1.50 to about 1.64 inches, more preferably 1.510 to 1.620 inches, and a compression of about 80 to about 115, more preferably 85 to 110.

Intermediate Layer

Figure 5:
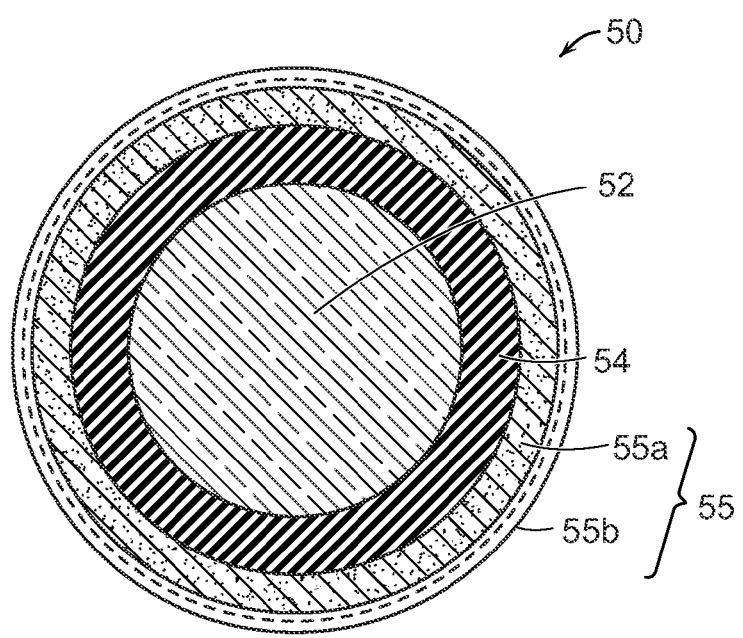
FIG. 5 is a cross-sectional view of a four-piece golf ball having a multi-layered polyurea cover made in accordance with the present invention.

The golf balls of this invention preferably include at least one intermediate layer. As used herein, the term, "intermediate layer" means a layer of the ball disposed between the core and cover. The intermediate layer may be considered an outer core layer or inner cover layer or any other layer disposed between the inner core and outer cover of the ball. The intermediate layer also may be referred to as a casing or mantle layer. The intermediate layer preferably has water vapor barrier properties to prevent moisture from penetrating into the rubber core. The ball may include one or more intermediate layers disposed between the inner core and outer cover. Referring to FIGS. 3-5, the golf balls are shown containing at least one intermediate casing layer positioned between the core and cover layers. The intermediate layer may be made of any suitable material known in the art including thermoplastic and thermosetting materials.

Suitable thermoplastic compositions for forming the intermediate core layer include, but are not limited to, partially- and fully-neutralized ionomers, particularly olefin-based ionomer copolymers such as ethylene and a vinyl comonomer having an acid group such as methacrylic, acrylic acid, or maleic acid; graft copolymers of ionomer and polyamide, and the following non-ionomeric polymers: polyesters; polyamides; polyamide-ethers, and polyamide-esters; polyurethanes, polyureas, and polyurethane-polyurea hybrids; fluoropolymers; non-ionomeric acid polymers, such as E/Y- and E/X/Y-type copolymers, wherein E is an olefin (e.g., ethylene), Y is a carboxylic acid, and X is a softening comonomer such as vinyl esters of aliphatic carboxylic acids, and alkyl alkylacrylates; metallocene-catalyzed polymers; polystyrenes; polypropylenes and polyethylenes; polyvinyl chlorides and grafted polyvinyl chlorides; polyvinyl acetates; polycarbonates including polycarbonate/acrylonitrile-butadiene-styrene blends, polycarbonate/polyurethane blends, and polycarbonate/polyester blends; polyvinyl alcohols; polyethers; polyimides, polyetherketones, polyamideimides; and mixtures of any two or more of the above thermoplastic polymers. The olefin-based ionomer resins are copolymers of olefin (for example, ethylene) and $\alpha,\beta$-ethylenically unsaturated carboxylic acid (for example, acrylic acid or methacrylic acid) that normally have 10% to 100% of the carboxylic acid groups neutralized by metal cations.

Examples of commercially available thermoplastics suitable for forming the intermediate core layer include, but are not limited to, Pebax® thermoplastic polyether block amides, commercially available from Arkema Inc.; Surlyn® ionomer resins, Hytrel® thermoplastic polyester elastomers, and ionomeric materials sold under the trade names DuPont® HPF 1000 and HPF 2000, all of which are commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; Clarix® ionomer resins, commercially available from A. Schulman Inc.; Elastollan® polyurethane-based thermoplastic elastomers, commercially available from BASF; and Xylex® polycarbonate/polyester blends, commercially available from SABIC Innovative Plastics. The foregoing filler materials may be added to the intermediate layer composition to modify such properties as the specific gravity, density, hardness, weight, modulus, resiliency, compression, and the like.

The ionomeric resins may be blended with non-ionic thermoplastic resins. Examples of suitable non-ionic thermoplastic resins include, but are not limited to, polyurethane, polyether-ester, poly-amide-ether, polyether-urea, thermoplastic polyether block amides (e.g., Pebax®block copolymers, commercially available from Arkema Inc.), styrene-butadiene-styrene block copolymers, styrene(ethylene-butylene)-styrene block copolymers, polyamides, polyesters, polyolefins (e.g., polyethylene, polypropylene, ethylene-propylene copolymers, polyethylene-(meth)acrylate, polyethylene-(meth)acrylic acid, functionalized polymers with maleic anhydride grafting, Fusabond® functionalized polymers commercially available from E. I. du Pont de Nemours and Company, functionalized polymers with epoxidation, elastomers (e.g., ethylene propylene diene monomer rubber, metallocene-catalyzed polyolefin) and ground powders of thermoset elastomers.

Cover Layer

Turning to FIG. 5, a four-piece golf ball (50) having a multi-layered cover is shown. The ball (50) includes a solid, one-piece rubber core (52), an intermediate layer (54), and multi-layered cover (55) constituting an inner cover layer (55a) and outer cover layer (55b). In this version, the inner cover layer (55a) is made of a conventional thermoplastic or thermosetting resin. For example, the inner cover (55a) may be made of polyurethane, polyurea, ionomer resin or any of the other cover materials described above. The inner cover (55a) preferably has a thickness of about 0.020 to about 0.050 inches and Shore D material hardness of about 50 to about 70. The outer cover layer (55a), which surrounds the inner cover layer (55b), is made of the polyurea or polyurea/urethane composition of this invention. The outer cover layer (55b) preferably has a thickness in the range of about 0.020 to about 0.035 inches and a Shore D material hardness in the range of about 45 to about 65. In another embodiment, a five-piece ball (not shown) may be made. The ball may include a core, intermediate layer (or outer core), and multi-layered cover constituting inner cover, intermediate cover, and outer cover layers.

It should be understood that the golf ball constructions shown in FIGS. 1-5 are for illustrative purposes only and are not meant to be restrictive. A wide variety of golf ball constructions may be made in accordance with the present invention depending upon the desired properties of the ball so long as at least one layer contains the polyurea or polyurea/urethane composition of this invention. The term, "layer" as used herein means generally any spherical portion of the golf ball. As discussed above, such constructions include, but are not limited to, three-piece, four-piece, and five-piece designs and the cores, intermediate layers, and/or covers may be single or multi-layered. Numerous other golf ball constructions having layers made of the polyurea and polyurea/urethane composition of this invention may be made.

The golf balls of this invention may be constructed using any suitable technique known in the art. These methods generally include compression molding, flip molding, injection molding, retractable pin injection molding, reaction injection molding (RIM), liquid injection molding (LIM), casting, vacuum forming, powder coating, flow coating, spin coating, dipping, spraying, and the like.

More particularly, the core of the golf ball may be formed using compression molding or injection molding. As described above, suitable core materials include thermoset materials, such as rubber, styrene butadiene, polybutadiene, isoprene, polyisoprene, trans-isoprene, as well as thermoplastics such as ionomer resins, polyamides or polyesters. The intermediate layer also may be formed using known methods such as, for example, retractable pin injection molding or compression molding. The intermediate layer can be made of commercially-available ionomer resins as described above.

This intermediate layer is covered with a cover layer using either reaction injection molding or a casting process. In a casting process, the polyurea mixture is dispensed into the cavity of an upper mold member. This first mold-half has a hemispherical structure. Then, the cavity of a corresponding lower mold member is filled with the polyurea mixture. This second mold-half also has a hemispherical structure. The cavities are typically heated beforehand. A ball cup holds the golf ball (core and overlying casing layer) under vacuum. After the polyurea mixture in the first mold-half has reached a semi-gelled or gelled sate, the pressure is removed and the golf ball is lowered into the upper mold-half containing the polyurea mixture. Then, the first mold-half is inverted and mated with the second mold-half containing polyurea mixture which also has reached a semi-gelled or gelled state. The polyurea mixtures, contained in the mold members that are mated together, form the golf ball cover. The mated first and second mold-halves containing the polyurea mixture and golf ball center may be next heated so that the mixture cures and hardens. Then, the golf ball is removed from the mold. The ball may be heated and cooled as needed.

The polyurea and polyurea/urethane compositions of this invention provide the golf ball cover with many advantageous properties and features. Particularly, the cover materials have good mechanical strength and cut/shear-resistance as well as light-stability. The polyurea and polyurea/urethane cover materials help enhance the weatherability of the golf balls.

It is understood that the golf balls described and illustrated herein represent only presently preferred embodiments of the invention. It is appreciated by those skilled in the art that various changes and additions can be made to such golf balls without departing from the spirit and scope of this invention. It is intended that all such embodiments be covered by the appended claims.

We claim:

1. A golf ball, comprising:
a core;
an intermediate layer surrounding the core; and
a cover layer surrounding the intermediate layer, the cover layer being formed from a polyurea or polyurea/urethane hybrid composition that is produced by the steps of: i) forming an isocyanate blend of hexamethylene diisocyanate (HDI) homopolymer having an average NCO functionality of 2.5, and 4,4'-dicyclohexylmethane diisocyanate ($H_{12}$MDI), wherein the hexamethylene diisocyanate (HDI) homopolymer having an average NCO functionality of 2.5 is present in the blend in an amount of 30 to 50 weight % and the 4,4'-dicyclohexylmethane diisocyanate ($H_{12}$MDI) is present in an amount of 70 to 50 weight %, and the blend has an average NCO functionality in the range of 2.05 to 2.35;
ii) reacting the isocyanate blend with a polyamine compound and a curing agent selected from the group consisting of amine-terminated curing agents, hydroxyl-terminated curing agents, and mixtures thereof.

2. The golf ball of claim 1, wherein the cover layer is formed from a polyurea composition.

3. The golf ball of claim 1, wherein the cover layer is formed from a polyurea/urethane hybrid composition.

4. The golf ball of claim 1, wherein the polyamine compound is selected from the group consisting of amine-terminated hydrocarbons, polyethers, polyesters, polycarbonates, polycaprolactones, and mixtures thereof.

5. The golf ball of claim 1, wherein the curing agent is an amine-terminated curing agent selected from the group consisting of 4,4'-diamino-diphenylmethane; 3,5-diethyl-(2,4- or 2,6-)toluenediamine; 3,5-dimethylthio-(2,4- or 2,6-)toluenediamine; 3,5-diethylthio-(2,4- or 2,6-)toluenediamine: 2,2'-dichloro-3,3',5,5'-tetraethyl-4,4'-diamino-diphenyl-methane; polytetramethyleneglycol-di(p-aminobenzoate); 4,4'-bis(sec-butylamino)-dicyclohexylmethane; and mixtures thereof.

6. The golf ball of claim 1, wherein the curing agent is a hydroxyl-terminated curing agent selected from the group consisting of ethylene glycol, diethylene glycol, polyethylene glycol, propylene glycol, polytetramethylene ether glycol, polyethylene propylene glycol, polyoxypropylene glycol, 2-methyl-1,3-propanediol, 1,4-butanediol, 2-methyl-1,4-butanediol, and mixtures thereof.

7. The golf ball of claim 1, wherein the core is a single piece core comprising a polybutadiene rubber composition.

8. The golf ball of claim 1, wherein the intermediate layer is formed from a thermoplastic or thermoset composition.

9. The golf ball of claim 8, wherein the intermediate layer is formed from a thermoplastic composition selected from the group consisting of ionomers; polyesters; polyester-ether elastomers; polyester-ester elastomers; polyamides; polyamide-ether elastomers, and polyamide-ester elastomers; polyurethanes, polyureas, and polyurethane-polyurea hybrids and mixtures thereof.

10. The golf ball of claim 8, wherein the intermediate layer is formed from a thermoset composition selected from the group consisting of polyurethanes, polyureas, and polyurethane-polyurea hybrids, epoxies, and mixtures thereof.

11. The golf ball of claim 1, wherein the core has a diameter of about 1.26 to about 1.60 inches and surface hardness in the range of about 30 to about 65 Shore D.

12. The golf ball of claim 1, wherein the intermediate layer has a thickness of about 0.015 to about 0.120 inches and surface hardness in the range of about 45 to about 75 Shore D.

13. The golf ball of claim 1, wherein the cover layer has a thickness of about 0.015 to about 0.090 inches and material hardness in the range of about 40 to about 65 Shore D.

* * * * *